Oct. 22, 1935.  H. NÄSS  2,018,378
COMBINATION HAND AND MACHINE GAS CUTTING APPARATUS
Filed Oct. 26, 1934  2 Sheets-Sheet 1
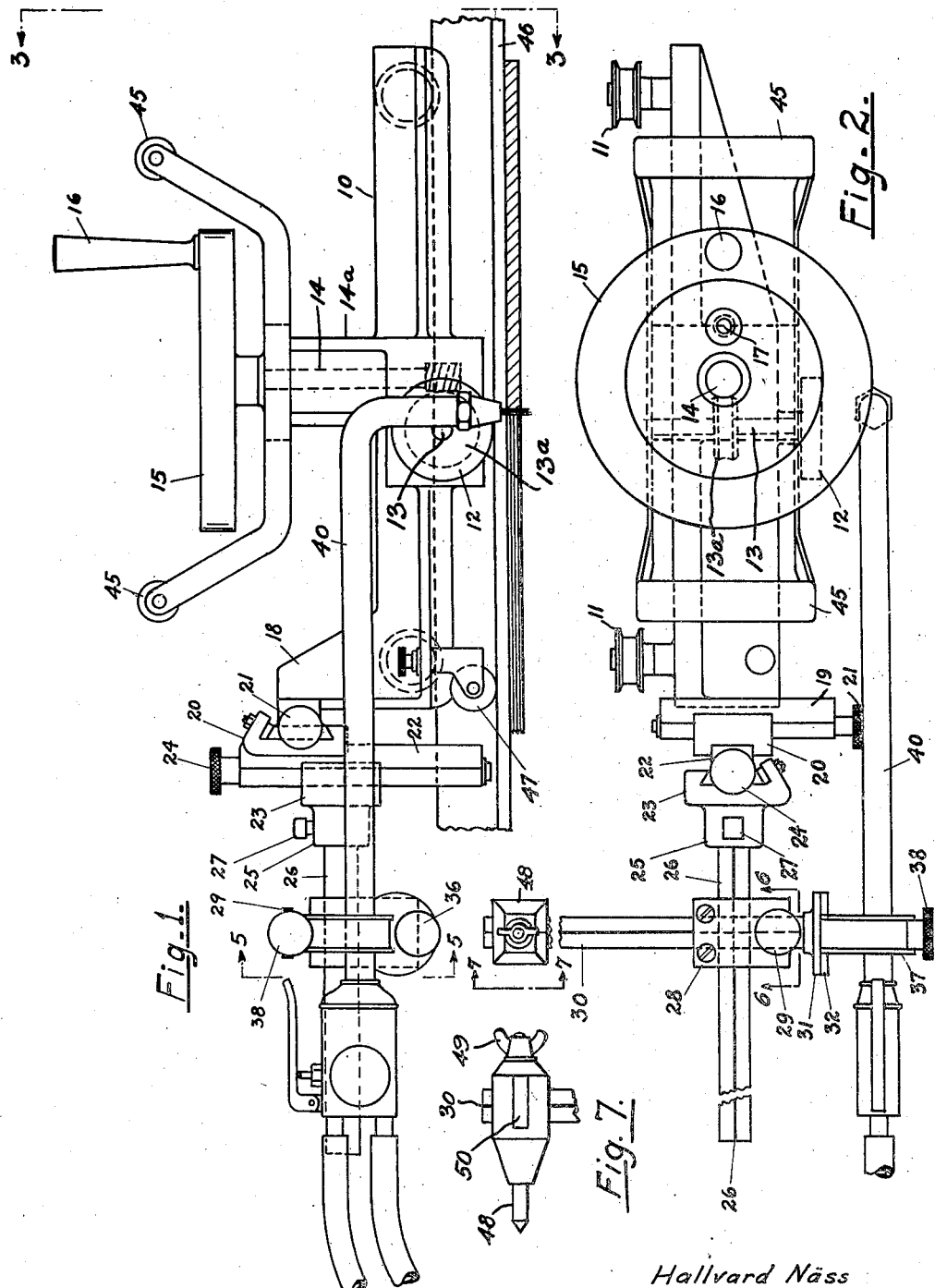
Hallvard Näss
INVENTOR
By Magnus Björndal
ATTY.

Oct. 22, 1935.  H. NÄSS  2,018,378
COMBINATION HAND AND MACHINE GAS CUTTING APPARATUS
Filed Oct. 26, 1934   2 Sheets-Sheet 2

Hallvard Näss
INVENTOR
By Magnus Björndal
ATTY.

Patented Oct. 22, 1935

2,018,378

UNITED STATES PATENT OFFICE 2,018,378

COMBINATION HAND AND MACHINE GAS CUTTING APPARATUS

Hallvard Näss, Moss, Norway, assignor to Magnus Bjørndal, Jersey City, N. J.

Application October 26, 1934, Serial No. 750,118
In Norway November 20, 1933

7 Claims. (Cl. 266—23)

This invention relates to improvements in the hand-driven type of gas cutting machines. Such machines have hitherto always included special speed regulating and indicating means as well as electric motors for driving. In addition the known machines of this type usually require special torches unsuitable for hand use which altogether makes them expensive and cumbersome in operation and thus unsuitable for smaller factories and repair shops where flexibility and low price is first consideration.

The object of my invention is, therefore, first to combine any standard hand torch with a light, inexpensive machine in a manner which will permit the use of the hand torch as such at any time and with the least possible work in changing from hand to machine gas cutting. A further object of my invention is to provide a hand-driven machine which does not require a speed governor and which nevertheless will be easy to operate at the correct speed and thus give as good cutting results as a more elaborate machine with speed regulating devices. A still further object of my invention is to provide a machine which without any elaborate adjustments will cut holes as well as outside radius from about 60 millimeters to 6 meters radius. Another object of my invention is to provide a machine which can use a common angle iron or channel as the guiding rail for straight cuts, such cuts may therefore be made of any length without any trouble as suitable guide rails will be available in any shop thus eliminating the costly guide rails required with the older type machines. A still further object of my invention is to provide a machine which will cut straight and circular bevels of any length and any radius. Another object of this invention is to provide an attachment to the torch for keeping the torch at a constant distance away from the plate in cutting plates of uneven surface. Other objects of my invention will be evident from the following specification and claims.

I attain these objects by a machine as shown in the accompanying drawings in which:—

Fig. 1 is a side elevation of a machine embodying my invention.

Fig. 2 is a plan view of the same machine.

Fig. 7 is a side view of the slidable center taken along line 7—7 in Fig. 2.

Similar numerals refer to similar parts throughout the several views.

Figure 3:
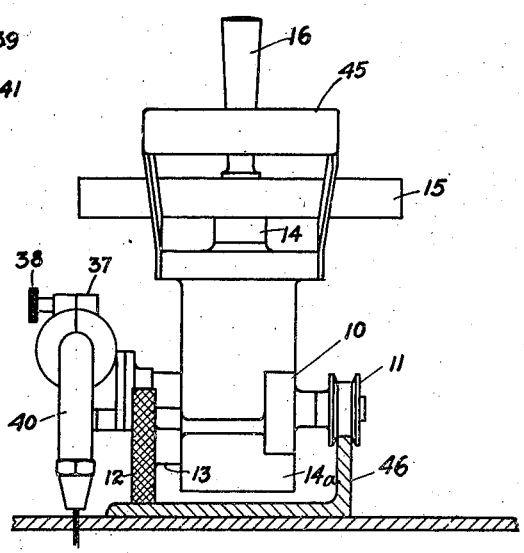
Fig. 3 is an end view of this machine, along line 3—3 in Fig. 1.

The carriage 10 is supported on two wheels 11 as illustrated in Figures 1, 2 and 3. A third wheel 12 is the driving wheel having a knurled surface for better gripping of the support. The shaft 13 of the gear 12 extends into the box 14a which contains a suitable gear reduction, which may preferably be a standard worm gear 13a, connecting said shaft 13 with shaft 14 at right angles with same. The upper end of said shaft 14 supports a flywheel 15 with a handle 16. In Fig. 2 is indicated how the handle 16 may be shifted to hole 17 for obtaining different speeds.

Figure 6:
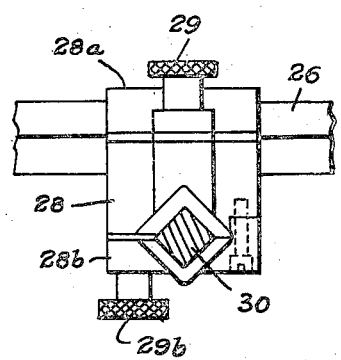
Fig. 6 shows an end view of the clamping fixture taken along line 6—6 in Fig. 2.

Referring to Figures 1 and 2, one end of the carriage 10 is formed as a bracket 18 which supports a transverse slide rest 19 on which a slide 20 is operable transversely back and forth by a knurled head screw 21. The slide 20 supports a vertical slide rest 22 supporting slide 23 which is operable up and down by the knurled head screw 24. The back of slide 23 is formed as a bushing 25 being a receptacle for the end of shaft 26 extending horizontally away from the carriage 10. The end of said shaft 26 is held securely in its receptacle 25 by set screw 27. The shaft 26 may preferably be of a square or other regular sided cross section and it carries a longitudinally slidable clamping fixture 28 which may be fixed in one position by tightening the screw 29. The clamping fixture 28 consists of three pieces, a centre block 28 and two identical, but opposing, clamps 28—a and 28—b as shown in Fig. 6. Transversely through this clamping fixture 28 is mounted shaft 30 which is also slidable in said fixture and may be fixed in one position by another screw 29a on the under side of said fixture 28. The shaft 30 may also preferably be of a square cross section.

Figure 5:
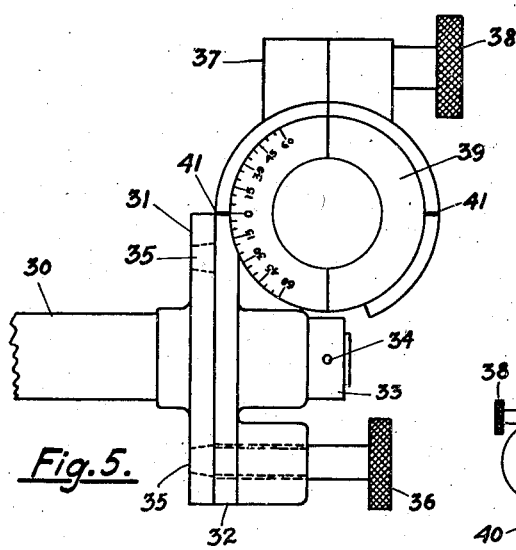
Fig. 5 is an enlarged partial elevation along line 5—5 in Fig. 1.

The end of shaft 30 is permanently fastened into a flange 31 against which is rotatably mounted a flange 32, see Fig. 5. This flange 32 is rotatable on shaft 30 the end of which is turned down to a round cross section with a retaining ring 33 secured by pin 34 on its outer end. Holes 35 are provided in flange 31 into which fits the end of screw 36 serving to hold flange 32 in a fixed position. By unscrewing 36 said flange 32 may be rotated 180° and fixed there by screwing 36 into hole 35. The flange 32 supports a clamp 37 which is split and may be tightened by screw 38 around the split bushing 39. This split bushing 39 is permanently fastened on the torch 40, see Figures 1, 2, 3 and 5. In Fig. 5 the clamps are shown without the torch. By unscrewing 38 it is thus possible to quickly release torch 40 for hand work. The split bushing 39 may have an inner hole suitably formed for the type of torch to be used, whether this be of the single or multiple tube type. On one side of the split bushing 39 are engraved gradations which when read against marks 41 on clamp 37 will give the angle for setting the torch to cut bevels, see Figures 4 and 5.

Figure 4:
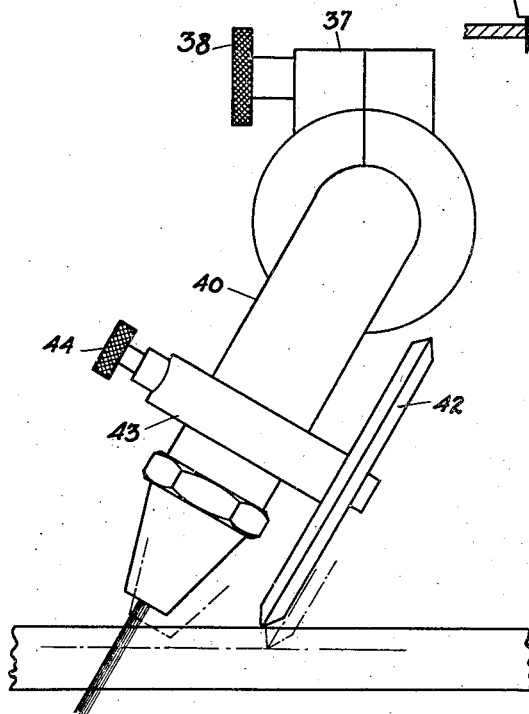
Fig. 4 is an enlarged end elevation of the torch set for cutting bevels.

In Fig. 4 is shown an attachment for holding the torch at a constant distance when cutting plates of bent and uneven surfaces. This attachment consists of a disk wheel 42 rotatably mounted on a ring 43 which is slidably mounted on torch 40 and may be fastened in place by screw 44.

Referring to Figures 1, 2 and 3, handle bars 45 are provided for lifting and handling the machine. The guide rail 46 is shown in Figs. 1 and 3 as an angle iron, but a suitable channel iron may be used just as well. A caster wheel 47 is provided for giving additional support to the machine in cutting holes or other circular cuts.

The operation of my machine is as follows: In setting up the machine for cutting straight cuts a suitable guide rail of the required length is selected. The plate to be cut is marked up in regular fashion and the guide rail is laid on top in as nearly as possible correct position. The machine is then placed on the rail and the torch is adjusted for rough adjustments by sliding clamp 28 on shafts 26 and 30. Fine adjustments are made by operating the screws 21 and 24 of the compound slide rests. The operator now starts the torch and at the same time starts turning flywheel 15 by crank 16. Due to the friction of the worm gear connecting flywheel 15 to drivewheel 12 and due to the inertia of the flywheel the carriage 10 can not be pushed forward quickly by applying direct hand pressure on the handle bars 45. A speed governor is therefore not necessary as the speed may be regulated by the operator in turning the wheel 15 by hand. If a higher speed is desired the handle 16 is placed in hole 17. There is no advantage to be gained in driving this machine by motor as the operator must be present watching the work anyway and the manual labor is not strenuous. With this machine, in the simple manner illustrated, bevels may be cut of any angle desired. These bevels are necessary and very important in many welding operations.

Holes and circular cuts may be made by using shaft 30 as a radius bar, a slidable center 48 being placed at suitable distance. The slidable center 48 is illustrated in detail in Fig. 7. It consists of a tapered body with center point 48, a wing nut 49 and an eye bolt 50 whereby the center may be fixed in one spot on the shaft 30. For this operation no guide rail is required, the machine resting on the driving wheel 12 and the caster wheel 47. For cutting holes of small radius the torch 40 is shifted over on the other side of shaft 26 by pulling shaft 30 out of clamp 28 and inserting from the other side. The machine will thus travel on a radius larger than the one to be cut and is thus easy to operate at the correct speed. Circular bevels can also be cut in the same manner as described, which together with straight bevel cutting is something which could not be accomplished by the older type machines.

It will thus be seen that there has been provided a simple, inexpensive, dependable and yet uniquely adjustable gas cutting machine. Although known elements have been used throughout the new combination of these elements is of a novel and valuable type capable of accomplishing something not previously possible, and well calculated to attain the various objects and advantages of the invention. While various particularities of description, as to parts and shapings and relations have been hereinabove detailed, this has been done in aid of disclosing as clearly as possible an embodiment of the invention as now preferred; and it is to be understood that these can be varied, apparently widely, within the appended claims, which define the scope of the protection contemplated.

I claim as new and desire to secure by Letters Patent of the United States:

1. In a gas cutting machine the combination of a torch carriage having on one side two grooved pulleys suitably mounted to travel on an elevated guide rail; a knurled driving wheel mounted on the other side of said carriage, a shaft connecting said driving wheel through a suitable gear reduction to a hand driven flywheel; a compound slide rest mounted on one end of said torch carriage, the outermost slide carrying a rod extending longitudinally and horizontally away from said carriage; a sliding fixture mounted on said rod, a transverse rod slidably mounted in said fixture, means for fixing said fixture and rods in a fixed position; a demountable torch clamp rotatably mounted on the end of said transverse rod; a split bushing held in said torch clamp, said split bushing being permanently mounted on a hand torch, said hand torch being held by said split bushing in said torch clamp and extending longitudinally of the carriage and being adjustable in all directions.

2. A combination hand and machine gas cutting apparatus as described in claim 1 where said split bushing mounted on said torch is rotatably mounted in said torch clamp and supplied with gradations corresponding to a mark on said torch clamp whereby said torch may be adjusted for cutting any angle bevels desired.

3. A combination hand and machine gas cutting apparatus as described in claim 1 where a rotatable and demountable caster is mounted on said carriage whereby a second support is furnished when the machine is used for circular cuts.

4. A combination hand and machine gas cutting apparatus as described in claim 1 where said transverse rod is supplied with a slidably adjustable centre whereby the machine can be used for cutting circular cuts.

5. A combination hand and machine gas cutting apparatus as described in claim 1 where an adjustable wheel is mounted on the end of said torch for keeping the correct distance in cutting uneven surfaces.

6. A combination hand and machine gas cutting apparatus as described in claim 1 where said gear reduction connecting said driving wheel shaft to said hand driven flywheel is a worm gear.

7. In a hand and machine gas cutting apparatus as described in claim 1 a sliding fixture comprising three parts, a central block and two identical clamps holding respectively said longitudinal and transverse rods in a fixed position, one of said clamps being releasable to permit the removal and insertion of said transverse rod from either side whereby holes of small radius may be cut.

HALLVARD NÄSS.